United States Patent

Komives et al.

[11] Patent Number: 6,125,274
[45] Date of Patent: Sep. 26, 2000

[54] MONITORING THE FUNCTIONALITY OF RADIOS IN A WIRELESS TELECOMMUNICATIONS SYSTEM

[75] Inventors: Steven John Komives, Carol Stream, Ill.; Thomas Elliott Wing, Mendham, N.J.

[73] Assignee: Lucent Technologies, Inc., Murray Hill, N.J.

[21] Appl. No.: 08/961,598

[22] Filed: Oct. 31, 1997

[51] Int. Cl.[7] .................................................. H04Q 7/20
[52] U.S. Cl. ........................................ 455/423; 455/67.1
[58] Field of Search ..................... 455/423, 67.1, 455/424, 425

[56] References Cited

U.S. PATENT DOCUMENTS

| | | | |
|---|---|---|---|
| 5,570,373 | 10/1996 | Wing | 455/67.1 |
| 5,687,217 | 11/1997 | Bliss et al. | 455/67.1 |
| 5,706,333 | 1/1998 | Greening et al. | 455/423 |
| 5,819,177 | 10/1998 | Vucetic et al. | 455/425 |
| 5,898,921 | 4/1999 | Liinamaa et al. | 455/423 |

*Primary Examiner*—Daniel S. Hunter
*Assistant Examiner*—Myron K. Wyche

[57] ABSTRACT

A technique for monitoring a radio in a base station for both catastrophic fault and intermittent faults is disclosed. Some embodiments of the present invention operate by observing and measuring the functionality of one radio with regard to other radios and inferring the status of the radios based on comparative statistical analysis of their respective functionality. An illustrative wireless telecommunications system comprises: N radios, each of which can receive a hail with substantially equal probability; N counters, each of which is uniquely associated with one of the N radios, that is incremented when a hail received by the associated server is acknowledged; and an alarm for indicating a fault with one of the N radios based on (1) a count, L, of the counter associated with the one of the N radios, and (2) a sum, S, of all of the counters.

20 Claims, 4 Drawing Sheets

100

300

600

MONITORING THE FUNCTIONALITY OF RADIOS IN A WIRELESS TELECOMMUNICATIONS SYSTEM

FIELD OF THE INVENTION

The present invention relates to telecommunications in general, and, more particularly, to a method and apparatus for monitoring the functionality of radios for both catastrophic and intermittent faults.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may also be known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to local- and toll-offices (e.g., local-office 130, local-office 138 and toll-office 140). Wireless Switching Center 120 is responsible for, among other things, establishing and maintaining calls between wireless terminals and between a wireless terminal and a wireline terminal, which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topology of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

Typically, a cell can contain dozens or hundreds of wireless terminals, each of which is either powered-on or powered-off. When a wireless terminal powers on and desires to either register with Wireless Telecommunications System 120 or to place a call, the wireless terminal transmits a hail to the base station serving the cell containing the wireless terminal.

FIG. 2 depicts a schematic diagram of wireless terminal 101-1 as it transmits a hail to base station 103-1. Base station 103-1 comprises N radios that can receive the hail and the probability that any one radio will receive the hail is substantially close to 1/N, in well-known fashion. If the radio is functioning properly, the radio will respond to the hail and initiate the process of registration.

In contrast, if the radio is not functioning at all, then the radio will fail to respond to the hail and the process of registration will not commence. In accordance with the prior art, a hail from a particular wireless terminal will always be received by a particular radio. Therefore, the problem exists that if the radio is not functioning and fails to respond to the hail, subsequent hails by the wireless terminal will also be received by the faulty radio and the wireless terminal will be effectively precluded from receiving service.

Furthermore, because wireless telecommunications system 100 does not know when or where a wireless terminal will transmit a hail, it is likely that a hail can be directed towards a radio in wireless telecommunications system 100 without wireless telecommunications system 100 knowing it. In other words, wireless telecommunications system 100 cannot distinguish between a functioning radio that simply receives no hails and a malfunctioning radio to which one or more hails are directed but not acknowledged because the radio is broken.

To add to the complexity of the problem, many malfunctioning radios suffer intermittent or graduated faults, in contrast to catastrophic faults. Therefore, a malfunctioning radio suffering an intermittent or graduated fault might, for example, receive 10 hails but only acknowledge and initiate registration for 8 of them. For the purposes of this specification, a radio that is totally broken is said to be suffering a "hard" fault. In contrast, a radio that is partially functioning because it has intermittent or graduated faults is said to be suffering a "soft" fault.

The presence of a faulty radio in wireless telecommunications system 100 is problematic for several reasons. First, when the user of a wireless terminal attempts access to wireless telecommunications system 100 and is unable to get service, the user usually gets frustrated or annoyed and that is bad for business for the operator of wireless telecommunications system 100. In addition, the operator of wireless telecommunications system 100 only gets paid when the system actually gets used, and if a radio is broken, then the operator loses money. Therefore, the need exists for a technique for quickly and reliably determining when a radio is suffering a fault.

Self-diagnostic test circuitry could be incorporated into the radio, but test circuitry has the disadvantage of increasing the complexity and cost of the radio itself. Furthermore, sometimes the test circuitry itself malfunctions and a properly functioning radio is declared by the test circuitry to be malfunctioning. In that case, a craftsperson is sent to inspect and repair the radio. In general, it is prohibitively expensive and annoying to assign craftspeople to fix radios that are not, in fact, broken.

As an alternative, a craftsperson could periodically inspect and test each radio using special-purpose test equipment, but skilled craftspeople are expensive and the process of inspection is invasive, which itself introduces the potential for damaging the radio.

Therefore, the need exists for a technique for determining when a radio is suffering a hard or soft fault in a manner that is less expensive and more reliable than techniques in the prior art.

SUMMARY OF THE INVENTION

Some embodiments of the present invention are capable of monitoring a server (e.g., a radio in a base station, a mechanical toll-collector in a multi-lane tollbooth, a central processing unit in a multi-CPU computer, etc.) for both hard and soft faults with fewer costs and restrictions than techniques in the prior art. In particular, some embodiments of the present invention do not need sophisticated self-diagnostic test-gear nor periodic inspection by a craftsperson nor are invasive. On the contrary, some embodiments of the present invention operate by merely observing and measuring the functionality of one server with regard to other servers and inferring the status of the servers based on comparative statistical analysis of their respective functionality.

For example, consider a case in which a base station comprises three radios and the probability of a wireless terminal hail being received by any one radio is ⅓. If Radio #1 acknowledges 147 hails during one time interval, Radio #2 acknowledges 152 hails during the same time interval, and Radio #3 acknowledges only 7 hails during the same time interval, intuition suggests that Radio #3 is probably broken and that is unlikely that the cost of inspecting the radio will be wasted because the radio is, despite the skewed distribution of hails, fully functional. Illustrative embodiments of the present invention extend this reasoning and develop in a formal manner a technique for monitoring the functionality of servers and to declare, with a given level of certainty, when a server is malfunctioning.

An illustrative embodiment of the present invention comprises: N servers, each of which can receive a task with substantially equal probability; N counters, each of which is uniquely associated with one of the N servers, that are incremented when a task received by the associated server is completed; and an alarm for indicating a fault with one of the N servers based on: (1) a count, L, of the counter associated with one of the N servers, and (2) a sum, S, of all of the counters.

DETAILED DESCRIPTION

Figure 1:
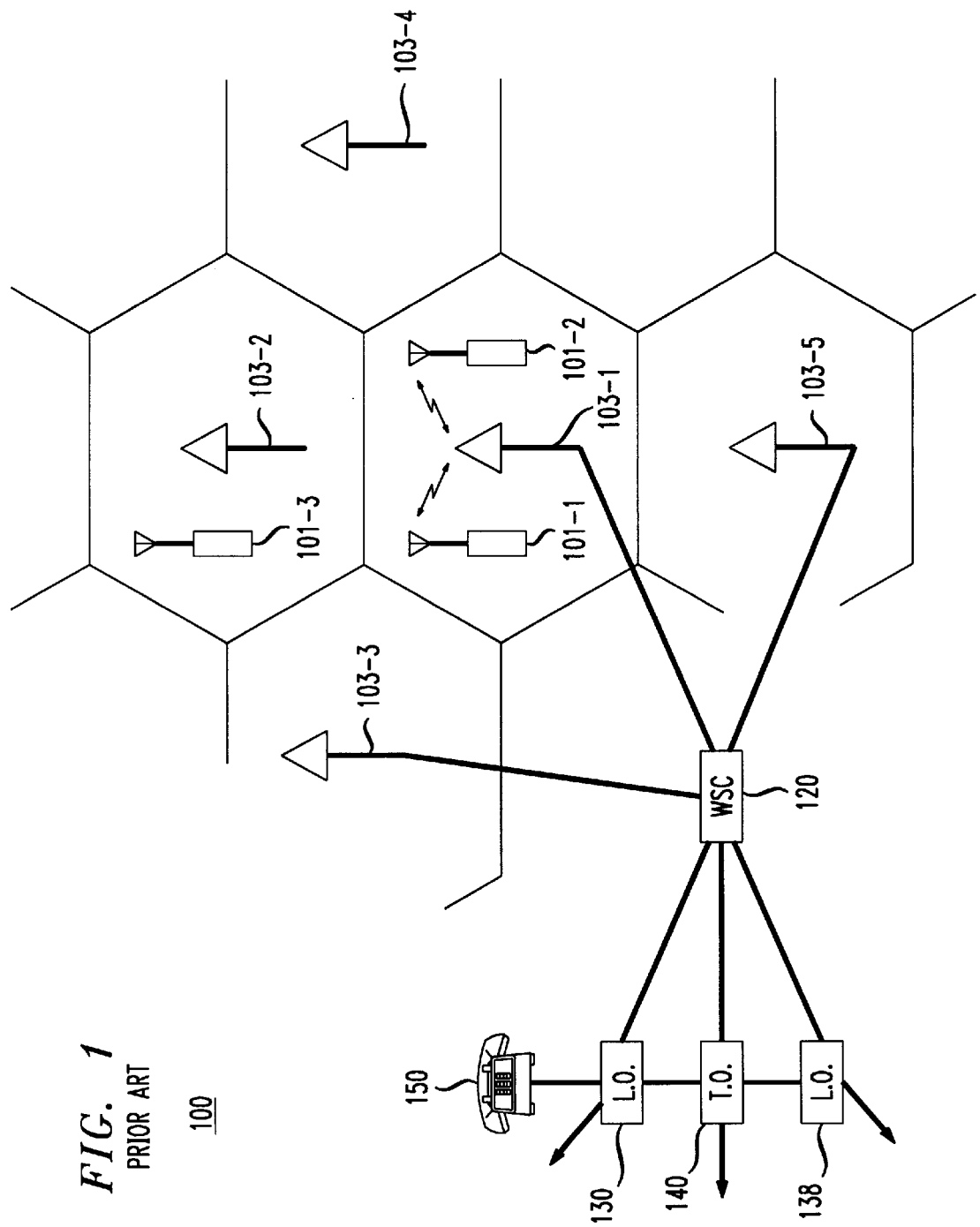
FIG. 1 depicts a schematic diagram of a wireless telecommunications system in the prior art.
Figure 2:
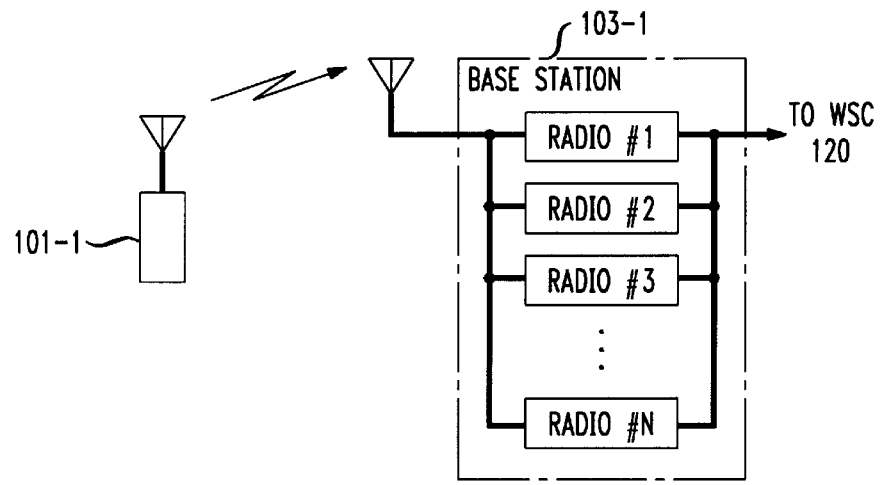
FIG. 2 depicts a schematic diagram of a wireless terminal as it attempts to hail a base station in the wireless telecommunications system of FIG. 1
Figure 3:
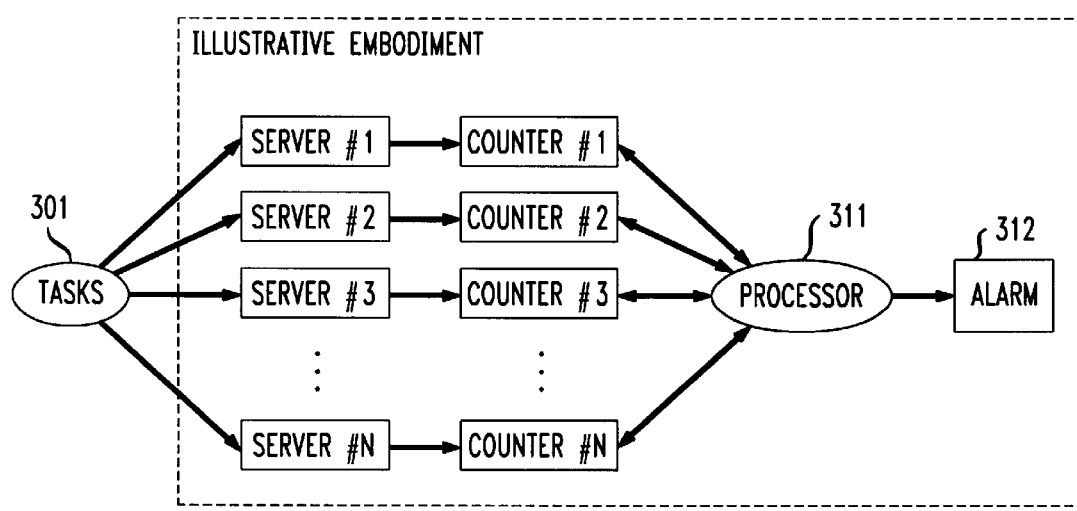
FIG. 3 depicts a block diagram of an illustrative embodiment of the present invention.

FIG. 3 depicts a block diagram of an illustrative embodiment of the present invention, which makes an educated guess about the functionality of a server by observing the operation of each server with respect to other similarly-situated servers. In other words, the illustrative embodiment posits an inference about the functionality or non-functionality of a server by comparing the number of tasks it completes in a given time interval relative to how many tasks are completed by the other servers with which it is working.

The illustrative embodiment in FIG. 3 advantageously comprises: N servers, N counters, processor 311 and alarm 312.

Each server is advantageously an apparatus (e.g., a radio in a base station, a mechanical toll-collector in a multi-lane tollbooth, a central processing unit in a multi-CPU computer, etc.) that is capable of receiving a task (e.g., a wireless terminal hail, a quarter coin, a compute job, etc.) and of completing that task (e.g., acknowledging the wireless terminal hail, acknowledging the deposit of the quarter and lifting a tollgate, completing the compute job, etc.). Each counter is advantageously uniquely associated with one of the N servers and is advantageously incremented each time the associated server completes a task. Furthermore, each counter can be physically co-located with the associated server, or some or all of the counters can be located remotely from the associated servers.

Figure 4:
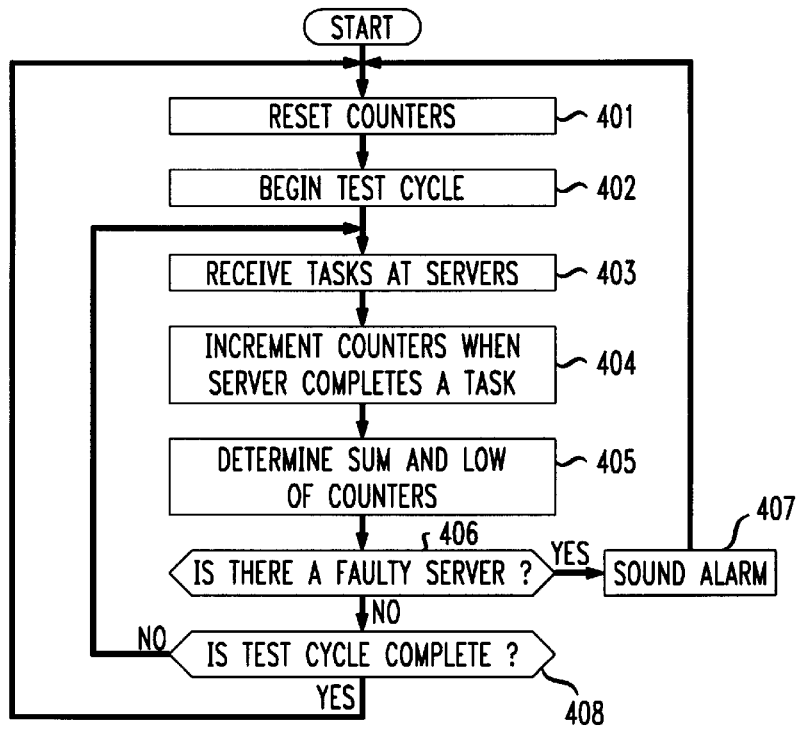
FIG. 4 depicts a flowchart of an outline of the steps performed by the illustrative embodiment of the present invention.

Processor 311 is advantageously an appropriately-programmed general-purpose computer or a hard-wired special-purpose computer with associated memory and input/output that is capable of performing the functionality outlined by the flowchart in FIG. 4. In particular, processor 311 is capable of receiving the count from each counter, and of resetting each counter, and of signaling alarm 312, when appropriate. Alarm 312 can be a visual or audible tocsin, in well-known fashion, or can be an indicator on a computer screen, in well-known fashion. Processor 311 and alarm 312 can be co-located with the N servers or with the N counters or both, or can be remotely located from the N servers or the N counters or both. When the illustrative embodiment is incorporated into a wireless telecommunications system, for example, to monitor the functionality of radios located in base stations, processor 311 and alarm 312 are advantageously located at the wireless switching center and the N counters are co-located with the radios.

FIG. 4 depicts a flowchart that outlines the steps performed by the illustrative embodiment of the present invention. At step 401, processor 311 advantageously resets all N counters before step 402, which marks the beginning of the test cycle. Advantageously, the illustrative embodiment continually conducts one test cycle after another.

At step 403, tasks arrive at the illustrative embodiment periodically or sporadically and are received at a given one of the N servers with a probability substantially close to 1/N. It is not necessary to the operation of the illustrative embodiment that the probability be exactly 1/N, just that it is substantially close.

At step 404, each time one of the N servers completes a task, the counter associated with that server is incremented once. As will be clear to those skilled in the art, steps 403 and 404 can be accomplished with, or without, the assistance or knowledge of processor 311.

At step 405, processor 311 periodically or sporadically determines two values: (1) the sum, S, of all N counters, and (2) the lowest count, L, of any of the N counters.

$$S = \sum_{1}^{N} counter_i \qquad \text{(Eq. 1)}$$

and $$L = \text{MIN}_{1}^{N} counter_i \qquad \text{(Eq. 2)}$$

If the sum, S, of all counters do not at least equal $N\chi_\alpha^2$, processor 311 waits a while and re-determines S and L. The value $N\chi_\alpha^2$ is N times $\chi_\alpha^2$, where $\chi_\alpha^2$ is the upper $\alpha$ point of the Chi-Square Distribution for the test cycle, as defined below. If processor 311 proceeds with the analysis of S and L before $S \geq N\chi_\alpha^2$, then the results of the test cycle might not have statistical significance within the desired level of confidence $\alpha$.

During steps 405 and 406, only the server associated with the counter having the lowest count, L, is considered as potentially suffering a fault.

At step 406, processor 311 calculates a measure of discrepancy, T, which is equal to:

$$\frac{(L-(S/N))^2}{(S/N)} \quad \text{(Eq. 3)}$$

It will be clear to those skilled in the art that the measure of discrepancy, T, and Eq. 3 are also equal to:

$$\frac{((S/N)-L)^2}{(S/N)} \quad \text{(Eq. 4)}$$

Functionally, the illustrative embodiment advantageously poses the null hypothesis, $H_0$, that the server associated with L is functioning properly. Then, the empirical data is used to evince that the null hypothesis is incorrect (i.e., the server is suffering a fault), with certainty $\alpha$, when the value T equals or exceeds $\chi_\alpha^2$, where $\chi_\alpha^2$ is the upper $\alpha$ point of the Chi-Square Distribution, wherein the degrees of freedom equal N−1. For a given $\alpha$ and N, it will be clear to those skilled in the art how to determine $\chi_\alpha^2$ using either published Chi-Square Distribution tables or from the Chi-Square formula:

$$F(\chi^2) = \int_0^{\chi^2} \frac{1}{2^{\frac{n}{2}} \Gamma\left(\frac{n}{2}\right)} x^{\frac{n-2}{2}} e^{\frac{-x}{2}} dx \quad \text{(Eq. 5)}$$

As an illustration, assume that during one test cycle, where there are N=4 servers, the following counts shown in Table 1 are recorded:

TABLE 1

Illustrative Test Cycle Data

| Counter | Value |
|---------|-------|
| #1 | 24 |
| #2 | 16 |
| #3 | 27 |
| #4 | 19 |

It can be seen that the sum, S, of the four counters is 86 and that the low, L, which is associated with Server #2 is 16. Therefore, from Eq. 3:

$$T = \frac{(L-(S/N))^2}{(S/N)} = \frac{(16-(86/4))^2}{(86/4)} = 1.407 \quad \text{(Eq. 6)}$$

If we are interested in being able to declare Server #2 faulty with 95% certainty, then from the Chi-Square distribution we find that for $\alpha$=0.95 and degrees of freedom=N−1=3, $\chi_\alpha^2$ equals 7.81. Because T=1.407 is less than $\chi_\alpha^2$=7.81, we cannot declare Server #2 faulty with 95% certainty.

Figure 5:
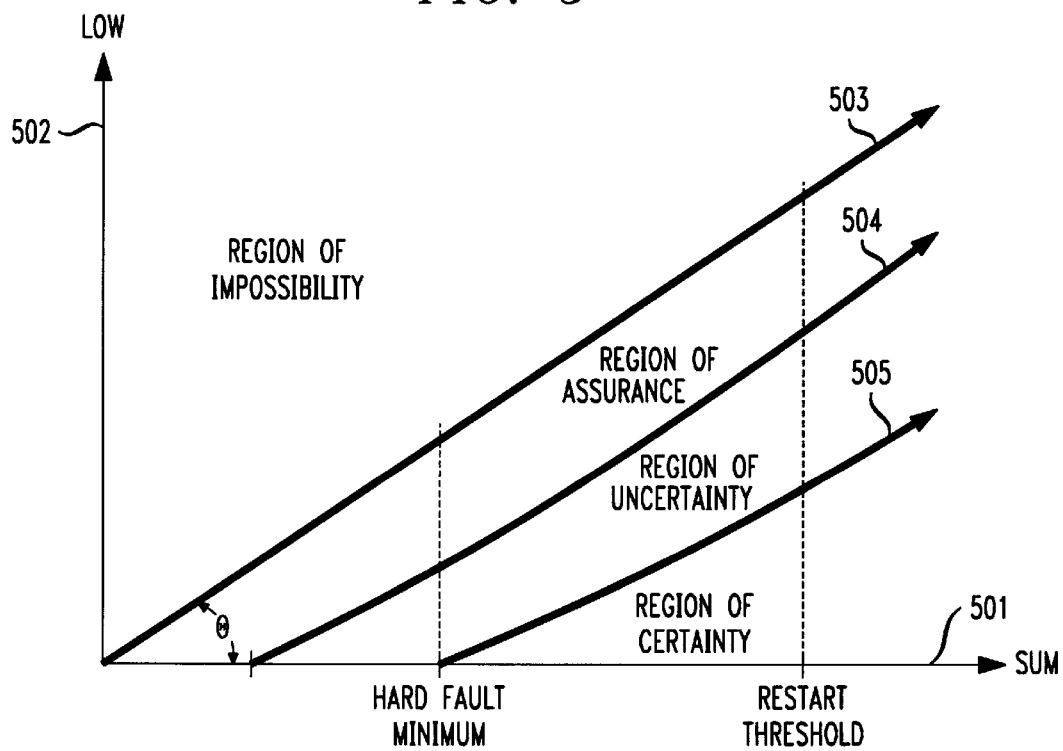
FIG. 5 depicts a graph used by the illustrative embodiment of the present invention to ascertain the functionality of a server.

Alternatively, a graph such as that shown in FIG. 5 can be constructed for a given value of N and $\alpha$. FIG. 5 is a graph of L vs. S for a given N and $\alpha$. The X-axis plots the sum, S, from a test cycle against the low, L, from the same test cycle. The graph is partitioned into four non-intersecting regions: (1) the Region of Impossibility, (2) the Region of Assurance, (3) the Region of Uncertainty, and (4) the Region of Certainty. The Region of Impossibility is that region above line 503, which intersects the axis at the angle $\theta=\tan^{-1}(1/N)$. No data from a test cycle can be in the Region of Impossibility because it is impossible for a low, L, to exceed (S/N).

The Region of Uncertainty and the Region of Certainty are separated by curve 505, which is computed as:

$$L = \text{Max}\left[0, (S/N) - \sqrt{\chi_\alpha^2 (S/N)}\right] \quad \text{(Eq. 7)}$$

where $\chi_\alpha^2$ is, as from above, determined for a given N and $\alpha$, in well-known fashion. As will be clear to those skilled in the art, curve 505 intersects the X-axis at:

$$N\chi_\alpha^2 \quad \text{(Eq. 8)}$$

which is the minimum sum at which a hard fault can be detected with certainty $\alpha$. When it is desired that the illustrative embodiment be capable of recognizing soft faults, more data must be collected until that $S \geq N\chi_\alpha^2$. When the results of S and L, from a given test cycle falls in the Region of Certainty, the illustrative embodiment can reasonably deem, with certainty $\alpha$, that the server of interest is malfunctioning, and control passes to step 407.

When a plot of S and L fall in the Region of Certainty and L=0, then a hard fault is detected. In contrast, when a plot of S and L fall in the Region of Certainty and L>0, then a soft fault is detected.

When a plot of S and L for a given test falls in the Region of Uncertainty, no statement about the functionality of the associated server can be made. When the results of S and L, from a given test cycle does not fall in the Region of Certainty, the illustrative embodiment cannot infer with certainty $\alpha$ that the server is malfunctioning, and control passes to step 408.

The Region of Assurance and its significance will be discussed below.

At step 407 processor 311 signals alarm 312 and the server associated with the low, L, is taken out of service, or is repaired, if possible. Then control passes to step 401 and a new test cycle is started.

Returning to step 408, when the data fail to indicate a malfunctioning server, the illustrative embodiment determines whether the test cycle is complete or not. To determine if the test is complete, processor 311 considers two factors. First, if S is greater than a restart threshold, then the test cycle is complete and control passes to step 401. When processor 311 only receives readings of the N counters periodically or sporadically, in contrast to continually or at will, the restart threshold, is advantageously lowered after either the first or each reading of the N counters by processor 311, so as to expedite the recognition of a faulty server. Clearly, the restart threshold, should be greater than $N\chi_\alpha^2$. With that consideration, it will be clear to those skilled in the art how to determine the restart threshold for a given implementation based on the degree of expediency with which it is desired to recognize a faulty server.

Second, if a plot of S and L in the graph of FIG. 5 fall in the Region of Assurance, then the test cycle is considered complete and control passes to step 401. Alternatively, if the plot of S and L fall in the Region of Uncertainty, and L is less than the restart threshold, then the test is not considered complete and control passes back to step 403 for the accumulation of more data.

The Region of Assurance and the Region of Uncertainty are demarcated by curve 504, which is computed as:

$$L = \text{Max}\left[0, (S/N) - \sqrt{\chi^2_{\alpha_2}(S/N)}\right] \qquad \text{(Eq. 9)}$$

where $\chi^2_{\alpha_2}$ is determined for a given N and a value of $\alpha_2$, where $\alpha_2$ is advantageously $\alpha/2$. As will be skilled in the art, curve 504 intersects the X-axis at:

$$N\chi^2_{\alpha_2} \qquad \text{(Eq. 10)}$$

even though the curve's utility is only defined in the region $S \geq N\chi^2_{\alpha}$.

Figure 6:
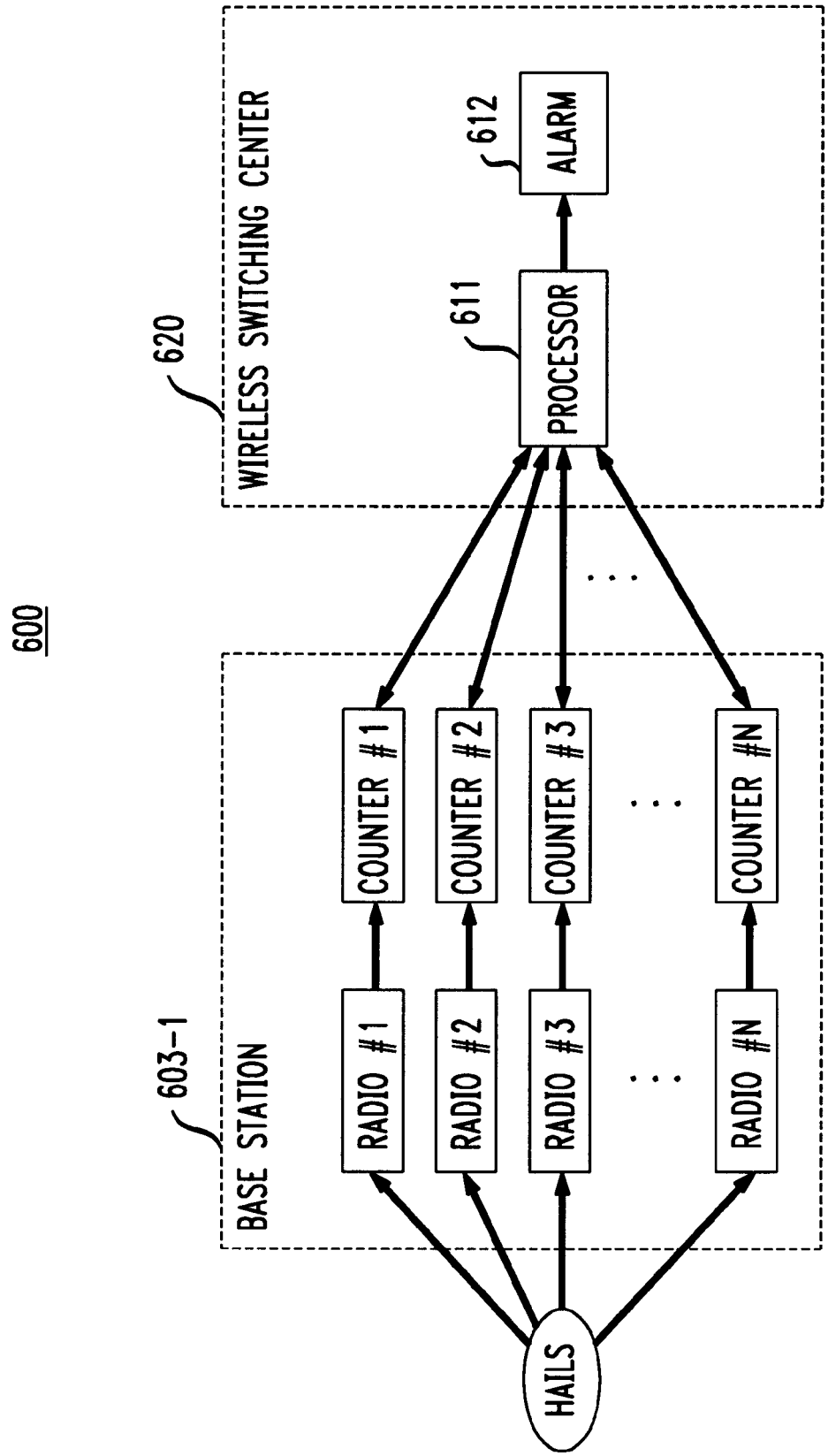
FIG. 6 depicts a block diagram of a wireless telecommunications system in accordance with the illustrative embodiment of the present invention.

FIG. 6 depicts a block diagram of a wireless telecommunications system in accordance with the illustrative embodiment of the present invention. Wireless telecommunications system 600 advantageously comprises base station 603-1 interconnected with wireless switching center 620, as shown. Base station 603-1 advantageously comprises N radios and N counters, where the N radios are treated in the same manner as the servers in FIG. 3. Wireless switching center 620 advantageously comprises processor 611, which is analogous to processor 311 in FIG. 3, and alarm 612, which is analogous to alarm 312 in FIG. 3. It will be clear to those skilled in the art how to make and use wireless telecommunications system 600.

It will be clear to those skilled in the art how to make and use embodiments of the present invention to monitor the functionality of a wide variety of machines, and it is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An apparatus comprising:
   N servers, each of which can receive a task with substantially equal probability;
   N counters, each of which is uniquely associated with one of said N servers, that are incremented when a task received by the associated server is completed; and
   an alarm for indicating a fault with one of said N servers based on: (1) a count, L, of said counter associated with said one of said N servers, and (2) a sum, S, of all of said counters.

2. The apparatus of claim 1 wherein said count of said counter associated with said one of said N servers is the low of all of said counters.

3. The apparatus of claim 1 wherein a fault is indicated only when T exceeds a threshold, wherein T is equal to $$\frac{(L-(S/N))^2}{(S/N)}.$$

4. The apparatus of claim 3 wherein said threshold is determined based on: (1) a desired level of certainty that said server has a fault, and (2) the value N−1.

5. The apparatus of claim 4 wherein said N counters are reset when T does not exceed said threshold.

6. A method comprising:
   receiving a task at one of N servers with substantially equal probability; incrementing a counter that is uniquely associated with one of said N servers when a task received by the associated server is completed; and
   indicating a fault with one of said N servers based on: (1) a count, L, of said counter associated with said one of said N servers, and (2) a sum, S, of all of said counters.

7. The method of claim 6 wherein the step of indicating comprises the step of determining said count, L, of said counter as the low of all of said counters.

8. The method of claim 6 wherein a fault is indicated only when T exceeds a threshold, wherein T is equal to $$\frac{(L-(S/N))^2}{(S/N)}.$$

9. The method of claim 8 wherein said threshold is determined based on: (1) a desired level of certainty that said server has a fault, and (2) the value N−1.

10. The method of claim 9 wherein said N counters are reset when T does not exceed said threshold.

11. A wireless telecommunications system comprising:
   N radios, each of which can receive a hail with substantially equal probability;
   N counters, each of which is uniquely associated with one of said N radios, that are incremented when a hail received by the associated server is acknowledged; and
   an alarm for indicating a fault with one of said N radios based on: (1) a count, L, of said counter associated with said one of said N radios, and (2) a sum, S, of all of said counters.

12. The wireless telecommunications system of claim 11 wherein said count of said counter associated with said one of said N radios is the low of all of said counters.

13. The wireless telecommunications system of claim 11 wherein a fault is indicated only when T exceeds a threshold, wherein T is equal to $$\frac{(L-(S/N))^2}{(S/N)}.$$

14. The wireless telecommunications system of claim 13 wherein said threshold is determined based on: (1) a desired level of certainty that said server has a fault, and (2) the value N−1.

15. The wireless telecommunications system of claim 14 wherein said N counters are reset when T does not exceed said threshold.

16. A method comprising:
   receiving a hail at one of N radios in a wireless base station with substantially equal probability;
   incrementing a counter that is uniquely associated with one of said N radios when a hail received by the associated server is acknowledged; and
   indicating a fault with one of said N radios based on: (1) a count, L, of said counter associated with said one of said N radios, and (2) a sum, S, of all of said counters.

17. The method of claim 16 wherein the step of indicating comprises the step of determining said count, L, of said counter as the low of all of said counters.

18. The method of claim 16 wherein a fault is indicated only when T exceeds a threshold, wherein T is equal to $$\frac{(L-(S/N))^2}{(S/N)}.$$

19. The method of claim 18 wherein said threshold is determined based on: (1) a desired level of certainty that said server has a fault, and (2) the value N−1.

20. The method of claim 19 wherein said N counters are reset when T does not exceed said threshold.

* * * * *